United States Patent
Azzar

(10) Patent No.: US 7,521,077 B2
(45) Date of Patent: Apr. 21, 2009

(54) APPARATUS FOR PORTIONING FLOWABLE MATERIALS

(76) Inventor: James Douglas Azzar, 208 Pioneer Club Rd. SE., East Grand Rapids, MI (US) 49506

(*) Notice: Subject to any disclaimer, the term of this patent is extended or adjusted under 35 U.S.C. 154(b) by 372 days.

(21) Appl. No.: 11/335,603

(22) Filed: Jan. 20, 2006

(65) Prior Publication Data

US 2006/0119009 A1 Jun. 8, 2006

Related U.S. Application Data

(62) Division of application No. 10/621,523, filed on Jul. 18, 2003, now Pat. No. 7,021,922.

(51) Int. Cl.
*B29C 45/40* (2006.01)
*A23P 1/10* (2006.01)
(52) U.S. Cl. .......................... 426/513; 426/646; 452/41
(58) Field of Classification Search ................. 426/646, 426/513; 452/41; 264/328.8
See application file for complete search history.

(56) References Cited

U.S. PATENT DOCUMENTS

| | | | | |
|---|---|---|---|---|
| 2,820,247 A | * | 1/1958 | Michaud | 425/382 R |
| 2,963,735 A | * | 12/1960 | Gandlitz | 452/41 |
| 3,177,524 A | * | 4/1965 | Gause | 425/556 |
| 3,490,093 A | * | 1/1970 | Mallas et al. | 425/441 |
| 4,118,831 A | | 10/1978 | Holly et al. | |
| 4,372,008 A | | 2/1983 | Sandberg | |
| 4,418,446 A | | 12/1983 | Sandberg et al. | |
| 4,622,717 A | * | 11/1986 | Bollinger | 425/562 |
| 4,646,385 A | | 3/1987 | Roberts et al. | |
| 4,768,941 A | | 9/1988 | Wagner | |
| 4,872,241 A | * | 10/1989 | Lindee | 425/573 |
| 5,730,650 A | | 3/1998 | Soper | |
| 5,795,610 A | | 8/1998 | London | |
| 6,416,314 B1 | | 7/2002 | LaBruno | |
| 6,454,559 B1 | | 9/2002 | Lindee | |
| 6,592,359 B2 | * | 7/2003 | Kennedy et al. | 425/572 |
| 6,604,935 B2 | | 8/2003 | Tournour et al. | |
| 6,713,111 B1 | | 3/2004 | Tournour et al. | |

* cited by examiner

*Primary Examiner*—Jill L Heitbrink
(74) *Attorney, Agent, or Firm*—Sughrue Mion, PLLC

(57) ABSTRACT

The invention relates to a portioning apparatus and a method. The apparatus includes a hopper and augers to push flowable material to a rotor. Retractable vanes on the rotor push the flowable material toward a fill slot as the rotor rotates. Below the fill slot, there is a mold plate with front and back mold cavities. In a front fill position, the mold plate is positioned so the front mold cavities are filled with flowable material from the fill slot while flowable material in the back mold cavities are pushed out by back knockouts. In a back fill position, the flowable material in the front mold cavities are pushed out by front knockouts while the back mold cavities are filled with flowable material from the fill slot. The mold plate reciprocatively oscillates between the front fill position and the back fill position for high output of portioned material.

7 Claims, 9 Drawing Sheets

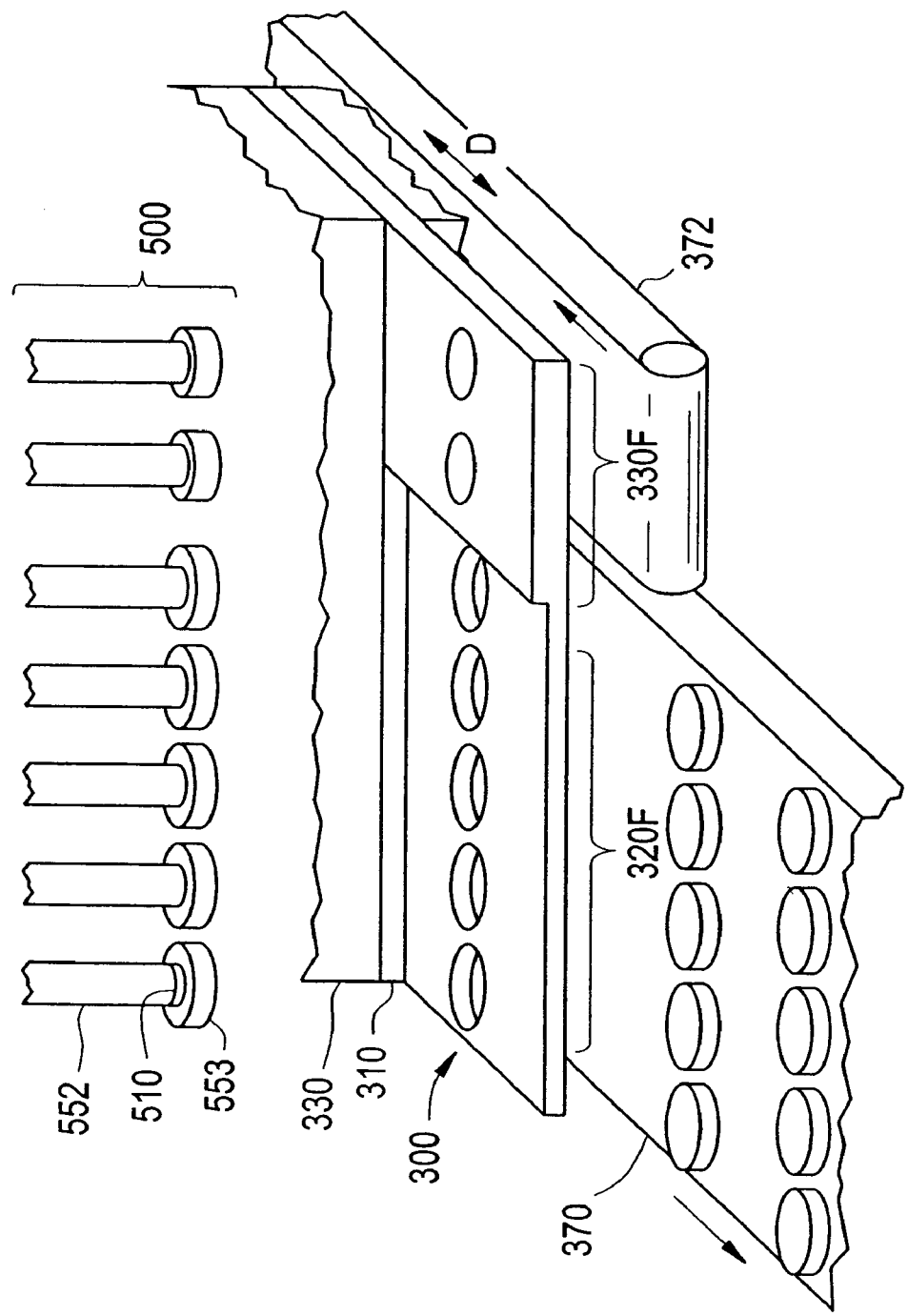

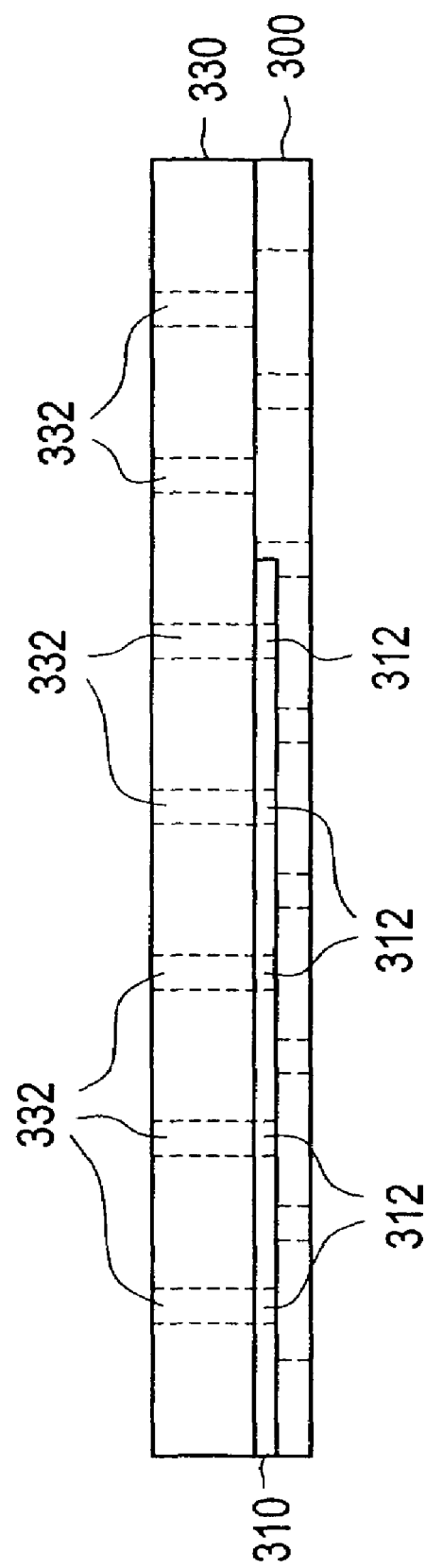

APPARATUS FOR PORTIONING FLOWABLE MATERIALS

This is a divisional of application Ser. No. 10/621,523 filed Jul. 18, 2003 now U.S. Pat. No. 7,021,922. The entire disclosure(s) of the prior application(s), application Ser. No. 10/621,523 is hereby incorporated by reference.

BACKGROUND OF THE INVENTION

1. Field of the Invention

This invention relates to a portioning apparatus and a method for portioning flowable materials. More particularly, the invention relates to a machine for the portioning of flowable materials, such as flowable food, and a method for the same.

2. Description of the Related Art

In certain industries, such as the food processing industry, portioning machines are used to portion flowable products. Flowable products include meat patties, flaked or shredded meat, fish, chicken, etc. In a portioning machine, there is a supply hopper which is fed with flowable material. An auger pushes the flowable material out a small opening to fill a mold. In the case of hamburger patties, the molds have a hollow flat cylindrical cavity in which the hamburger meat is filled. After the cavity is filled, the mold is moved underneath a knockout which knocks out the hamburger meat in the cavity to a conveyor belt below, in a knockout stroke. The combined process of filling and knocking out takes place in one mold stroke.

Current portioning machines have only one knockout stroke per mold stroke. In other words, the hamburger mold is filled in one step and in a subsequent separate step, the hamburger patty is knocked out. Such portioning machines typically run at a certain level of knockout strokes per minute. To increase the amount of knockout strokes, however, prohibitively high mechanical and hydraulic costs are required. Therefore, a scheme for increasing the knockout rate, and hence, increase product output, without high implementation and maintenance costs is desired.

SUMMARY OF THE INVENTION

An apparatus for portioning flowable material comprising means for receiving the flowable material, means for urging the flowable material received in the flowable material receiving means toward a fill slot, and a mold for receiving the flowable material from the means for urging the flowable material is disclosed. The mold has a first mold cavity at a first end of the mold and a second mold cavity at a second end of the mold. There is a first removal means for removing flowable material from first mold cavity, a second removal means for removing flowable material in second mold cavity, and a means for reciprocatively positioning the mold at one of a first fill position and a second fill position. The fill slot communicates with the first mold cavity and the second removal means is disposed at about the second mold cavity in the first fill position and the fill slot communicates with the second mold cavity and the first removal means is disposed at about the first mold cavity in the second fill position.

In addition, a method for portioning flowable material is disclosed. The method includes urging the flowable material through a fill slot toward a mold having a first mold cavity and a second mold cavity, reciprocatively positioning the mold along a path, at one of first and second positions, filling the first mold cavity with flowable material and removing flowable material from the second mold cavity when the mold is at the first position, and filling the second mold cavity with flowable material and removing flowable material from the first mold cavity when the mold is at the second position.

Moreover, a system for processing materials is disclosed. The system includes unportioned flowable material, means for receiving the unportioned flowable material, means for urging the unportioned flowable material received in the flowable material receiving means toward a fill slot. At the fill slot, there is a mold for receiving the unportioned flowable material from the means for urging the flowable material, the mold having a first mold cavity at a first end of the mold and a second mold cavity at a second end of the mold. There is a first removal means for removing a first portioned material from first mold cavity, a second removal means for removing a second portioned material in second mold cavity, and a means for reciprocatively positioning the mold at one of a first fill position and a second fill position. The fill slot communicates with the first mold cavity and the second removal means is disposed at about the second mold cavity when the mold is in the first fill position and the fill slot communicates with the second mold cavity and the first removal means is disposed at about the first mold cavity when the mold is in the second fill position. In addition, there are means for conveying first and second portioned material removed from first and second mold cavities.

Further, an apparatus for moving flowable material inside a rotor housing to urge flowable material toward a mold in a portioning machine is disclosed. The apparatus includes a rotor disposed within the rotor housing, having a rotation axis, a plurality of vanes disposed outwardly from rotation axis in the rotor, and means for moving a vane of the plurality of vanes in between an extended position wherein the vane projects beyond an outer surface of the rotor and a retracted position wherein the vane is retracted into the rotor. The vane is in the extended position when the vane is substantially moving toward the fill slot to urge the flowable material toward the fill slot and is in the retracted position when the vane is substantially moving away from the fill slot.

Furthermore, an apparatus for portioning flowable material and transporting portioned flowable material, wherein the apparatus is disposed in a portioning machine which provides the flowable material to the apparatus via a first fill slot, and reciprocatively moved along a guide path in the portioning machine, is disclosed. The apparatus comprises a first plurality of means for portioning including a first means of a first predetermined size for portioning, the first means for portioning having a first opening disposed at one of the first fill slot and a first means for pushing out a first portioned material therein. There is also a second plurality of means for portioning including a second means of the first predetermined size for portioning, the second means for portioning having a second opening disposed at one of the first fill slot and a second means for pushing out a second portioned material therein. In addition, the first opening is disposed at the first fill slot if the second opening is disposed at the second means for pushing out, and the first opening is disposed at the first means for pushing out if the second opening is disposed at the fill slot.

BRIEF DESCRIPTION OF THE DRAWINGS

Other features and advantages of the present invention will be apparent from the following description taken in connection with the accompanying drawings, wherein:

FIG. 8 is a perspective view of yet another embodiment of the invention; and

FIG. 9 is a cross sectional view of the yet another embodiment of the invention.

DETAILED DESCRIPTION OF THE PREFERRED EMBODIMENTS

Figure 1:
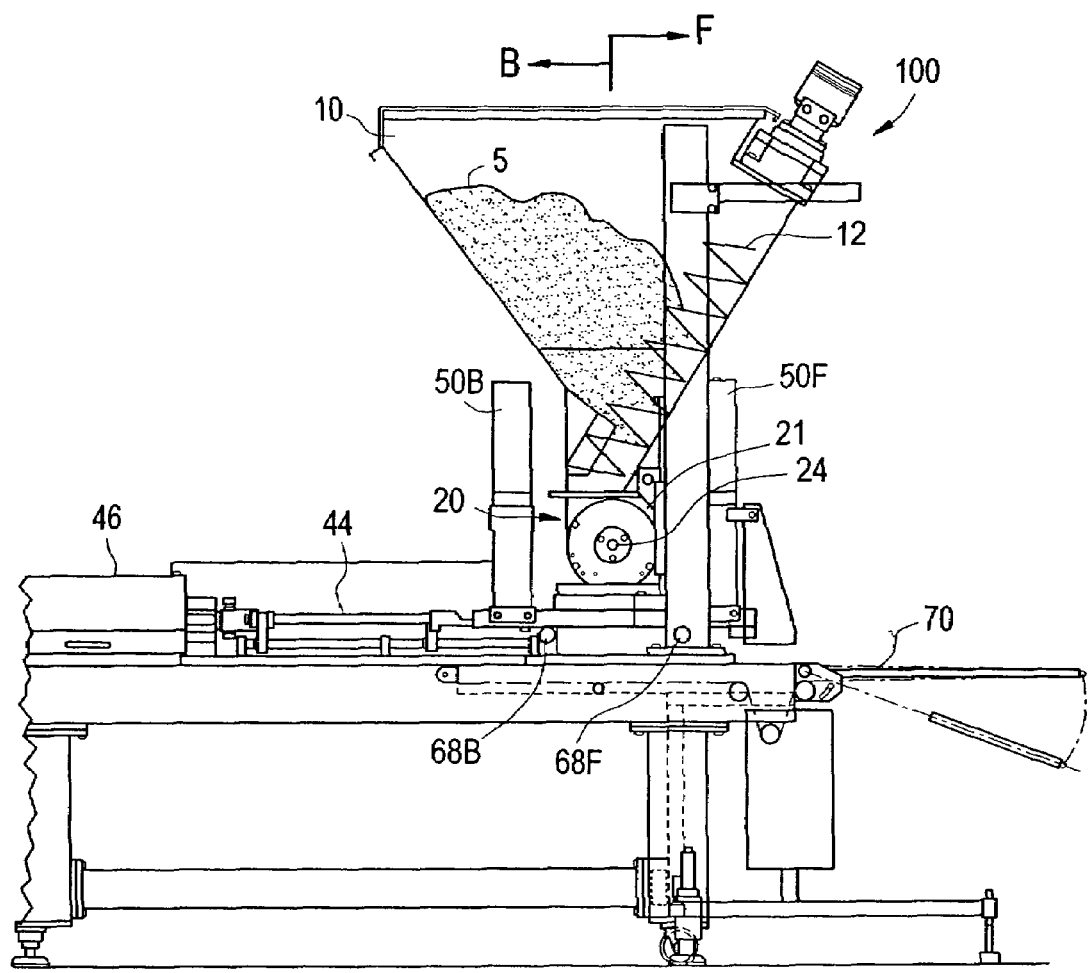
FIG. 1 is a side view of an embodiment of the invention.
Figure 2:
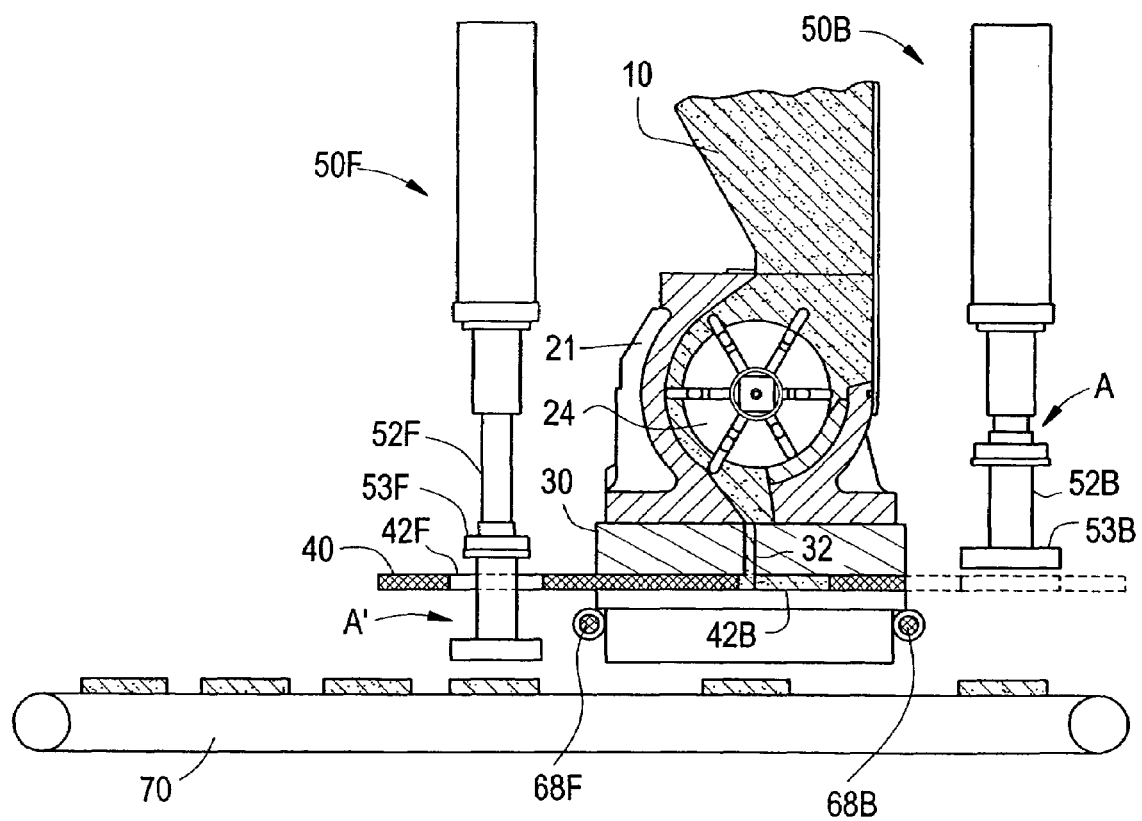
FIG. 2 is a cross sectional side view of the embodiment of the invention.
Figure 3:
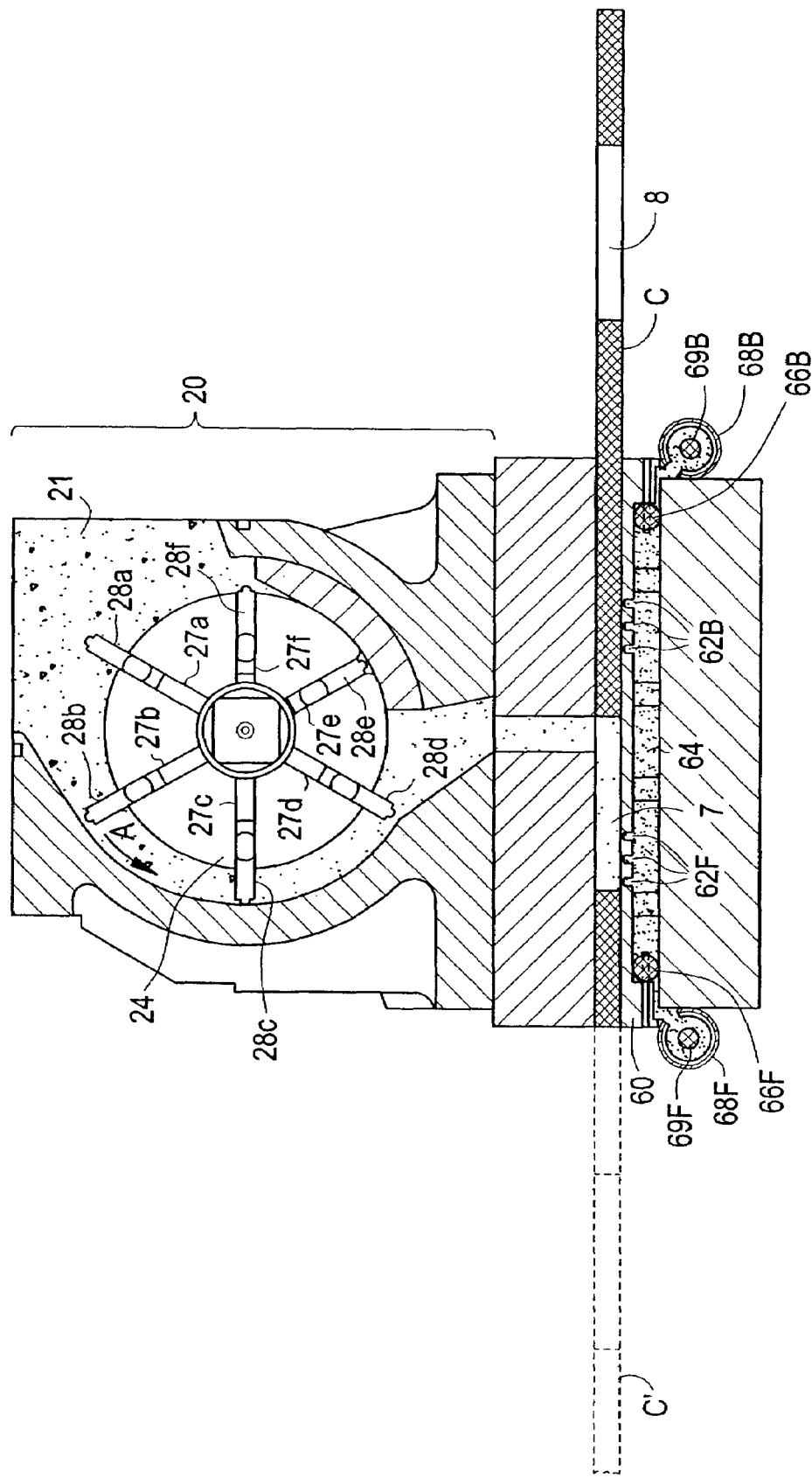
FIG. 3 is another cross sectional side view of the embodiment of the invention.

An exemplary embodiment will now be described with reference to FIGS. 1-3. A side view of a portioning apparatus 100 is shown in FIG. 1, a cross sectional view is shown in FIG. 2, and a smaller cross sectional view is shown in FIG. 3. In FIG. 1, the portioning apparatus 100 includes a front F and a back B, and a supply hopper 10 into which flowable material 5 such as flaked, shredded, or ground meat, fish, chicken, pork, potatoes, dough, etc., is received. Inside the supply hopper 10, there is a plurality of augers 12 leading down toward the bottom of the supply hopper 10 to a rotor assembly 20. Below the rotor assembly 20, there is a fill plate 30 with a fill slot 32 (FIG. 2). The size and positioning of the fill slot 32 varies with the type and size of the flowable material.

Underneath the fill plate 30, there is a mold plate 40 with a front mold cavity 42F and back mold cavity 42B, generally corresponding to the front F and the back B of the portioning apparatus 100. Each of the mold cavities 42F, 42B have an opening at the top through which mold cavities 42F, 42B are filled with flowable material and through which means for removing the portioned material from the mold cavities 42F, 42B travels through. As will be described below, the design of the mold plate 40 allows the portioning apparatus to fill in one mold cavity and knockout a portioned material in another mold cavity, simultaneously.

There is a front knockout assembly 50F and a back knockout assembly 50B disposed at the front F and back B of the portioning machine 100, respectively. The front and back knockout assemblies 50F, 50B have front and back knockout shafts 52F, 52B, respectively. At the bottom of the front and back knockout shafts 52F, 52B, there are front and back knockout cups 53B, 53F. Underneath the front and back knockout assemblies 50F, 50B, there is a conveyor belt 70.

Beneath the mold plate 40, there is a breather plate 60 (FIG. 3). In the breather plate 60, there are front and back air vents 62F, 62B. The front and back air vents 62F, 62B communicate with an air chamber 64. At the front of the air chamber 64, there is a front air release valve 66F and at the back of the air chamber 64, there is a back air release valve 66B. A front tube 68F communicates with the air chamber 64 at the front and a back tube 68B communicates with the air chamber 64 at the back. Within the front and back tubes 68F, 68B, there are front and back augers 69F, 69B.

Figure 4:
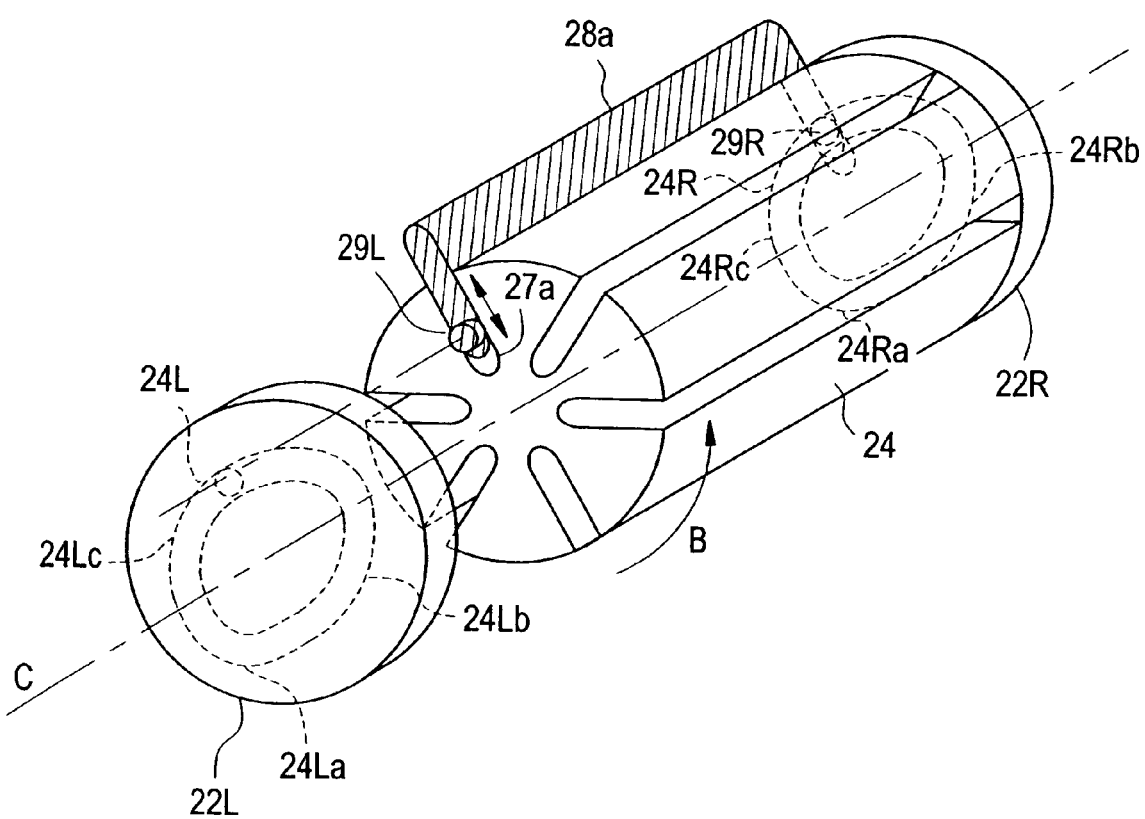
FIG. 4 is a perspective view of the embodiment of the invention.

With respect to FIGS. 3-4, the rotor assembly 20 is described. The rotor assembly 20 includes a rotor housing 21, left and right rotor end covers 22L, 22R, and a rotor 24. The left and right rotor end covers 22L, 22R and the rotor 24 are coaxially disposed along center rotation axis C. The left and right rotor end covers 22L, 22R are each fixedly attached to inside surfaces of the rotor housing 21. On a surface of the left rotor end cover 22L interfacing with a left end of the rotor 24, there is a left cam track 24L. The left cam track 24L is a continuous loop and is disposed at a variable distance from the center rotation axis C at different points on the left cam track 24L. In other words, the cam track 24L has two roughly flat sections 24La and 24Lb and an approximately round section 24Lc. The round section 24Lc has a radius of curvature that is less than the radius of curvature of the flat sections 24La and 24Lb of the cam track 24L. Further, the round section 24Lc is generally disposed further away from the center rotation axis C than most parts of the flat sections 24La and 24Lb.

In an alternative embodiment, the flat sections 24La and 24Lb have decreasing and increasing radii of curvature, respectively.

Likewise, there is a right cam track 24R with two roughly flat sections 24Ra and 24Lb and an approximately round section 24Rc on the right rotor end cover 22R.

The rotor 24 is disposed between the left and right rotor end covers 22L, 22R and has a plurality of vane slots 27a, 27b, 27c, 27d, 27e, 27f extending substantially radially outward from the center rotation axis C, with corresponding vanes 28a, 28b, 28c, 28d, 28e, 38f slideably disposed inside. The following is a description of vane slot 27a and vane 28a representative of all vane slots 27a, 27b, 27c, 27d, 27e, 27f and vanes 28a, 28b, 28c, 28d, 28e, 38f. The vane slot 27a and vane 28a extend laterally along the axial length of the rotor 24. At the opposing side edges of the vane 28a interfacing the left and right rotor end covers 22L, 22R, there is a left cam follower 29L and a right cam follower 29R. The left and right cam followers 29L, 29R are engaged in respective left and right cam tracks 24L, 24R.

In another embodiment, means known in the art for urging flowable material received from the hopper 10 down toward the fill plate 30 is used.

Hereinafter, the operation of the portioning apparatus 100 will be described. As the flowable material 5 is fed into the supply hopper 10, the flowable material 5 is pushed by the action of the plurality of augers 12 toward the bottom of the supply hopper 10 and toward the rotor assembly 20. The rotor assembly 20 operates as a pump to press the flowable material 5 toward the fill slot 32 below.

Specifically, as the rotor 24 rotates about the center rotation axis C, the vanes 28a, 28b, 28c, 28d, 28e, 38f push the flowable material 5 toward the fill slot 32. For example, vane 28a, in an extended position in the vane slot 27a, pushes the flowable material 5 toward the bottom of the rotor assembly 20 and the fill slot 32, as the rotor 24 rotates. The rotor 24 and the vane 28a rotate together in the counterclockwise direction B according to the embodiment shown in FIG. 3.

If a clock face is superimposed on the side of the rotor 24 coupled to the left rotor end cover 22L shown in FIG. 3, then the vane 28a is in the fully extended position when disposed at about the 1 o'clock position. In the fully extended position, the left and right cam followers 29L, 29R enter respective round sections 24Lc and 24Rc of the cam tracks 24L, 24R. As the rotor 24 rotates, the left and right cam followers 29L, 29R travel along the center sections 24Lc and 24Rc of the cam tracks 24L, 24R. Because of the center sections 24Lc and 24Rc have constant radius with respect to the center rotation axis C, the vane 28 stays in an extended position.

At approximately the 7 o'clock position, the cam follower 29L travels into the flat section 24La. Due to the different radius of curvature of the flat section 24La, the vane 28a is retracted into the slot 27a. At the position where the vane 28a is fully retracted into the slot 27a, the inside surface of the rotor housing 21 meets the outer surface of the rotor 24 to prevent the flowable material 5 from being pushed back up to the supply hopper 5.

Starting from about the 5 o'clock position, the cam guide follower 29L enters the flat section 24Lb. Therefore, the vane 28a slides toward the fully extended position as the cam follower 29L travels along the cam track 24L toward the center section 24Lc.

Through the action of vanes 28a, 28b, 28c, 28d, 28e, 28f, a pressure is generated in the flowable material 5 at the bottom of the rotor assembly 20. The pressure forces the flowable material 5 out through the fill slot 32 toward the mold plate 40.

As mentioned above, the mold plate 40 has two mold cavities, the front mold cavity 42F and the back mold cavity 42B. In the portioning apparatus 100, the mold plate 40 reciprocates or cyclically moves between two positions, a front fill position C (FIG. 3) and a back fill position C', along a substantially linear path. It is noted that the mold plate 40 is driven by a mold plate drive 44 of an hydraulic cylinder 46 to move the mold plate 40 back and forth between the front fill position C and the back fill position C'. Alternatively, in another embodiment, the mold plate is driven by other means known in the art.

When the mold pate 40 is in the front fill position, the front mold cavity 42F is aligned beneath the fill slot 32 and the back mold cavity 42B is disposed underneath the back shaft 52B of the back knockout assembly 50B as shown in FIG. 3. As the flowable material 5 is pushed out of fill slot 32, the flowable material 5 fills the front mold cavity 42F to form a portioned material such as a hamburger patty 7.

As the front mold cavity 42F is filled, the air inside the front mold cavity 42F is vented out through the front vent 62F in the breather plate 60 into the air chamber 64. Air pressure inside the air chamber 64 is regulated or controlled by the front and back air release valves 66F, 66B. Further, flowable material 5 or parts of the flowable material 5 such as blood, can also fall through the front vent 62F to collect in the air chamber 64 and the front and back tubes 68F, 68B.

Further, the back knockout shaft 52B extends through the back mold cavity 42B to permit the back knockout cup 53B to push out the portioned material 5 in the back mold cavity 42B in the shape of a hamburger patty 8, for example. After the front mold cavity 42F is suitably filled and the hamburger patty 8 is knocked out of the back mold cavity 42B, the mold plate 40 is shifted to the back fill position C'.

In the back fill position C', the front mold cavity 42F is now disposed underneath the front knockout assembly 50F and the front knockout shaft 52F, and the back mold cavity 42B is disposed underneath the fill slot 32. In a front knockout stroke, the front shaft 52F extends downward to allow the front knockout cup 53F to knock out the hamburger meat patty 8, from the front mold cavity 42F. The knocked out hamburger patty 8 falls on the conveyor belt 70 to be conveyed downstream, as shown in FIG. 2. Meanwhile, the flowable material 5 fills the back mold cavity 42B to form another hamburger patty in the back mold cavity 42B, to finish a complete mold plate stroke.

When the back mold cavity 42B is filled, the back air vents 62B permit the air within the back mold cavity 42B to escape into the air chamber 64. Likewise, the air pressure inside the air chamber 64 is controlled by front and back air release valves 66F, 66B. Because the front air vents 62F and the back air vents 62B both communicate with the air cavity 64, an approximately even air pressure is maintained at the front and back mold cavities 42F, 42B. Over time, parts of the flowable material 5 can build up inside the air chamber 64 and the front and back tubes 68F, 68B. By the rotation of the front and back augers 69F, 69B, a build up of flowable material 5, in particular the liquid parts of the flowable material 5 such as blood, can be purged from the front and back tubes 68F, 68B, respectively.

The conveyor 70 located beneath the portioning apparatus 100 transports all the knocked out portioned materials to one side of the portioning apparatus 100. To allow an even distribution of portioned materials on the conveyor belt 70, the speed of the conveyor belt 70 is controlled according on the mold plate stroke rate. In an embodiment, the conveyor belt is run continuously or intermittently.

Alternatively, in another embodiment, there are two conveyor belts 370, 372 under the portioning machine so that the knocked out portioned material is collected on both sides of the portioning machine (FIG. 8).

When compared to the conventional system, the portioning apparatus 100 can provide twice the number of knockout strokes per one mold plate stroke. Therefore, the portioning apparatus 100 can output twice the number of portioned materials produced by a conventional portioning machine.

In an alternative embodiment, there is a column of a plurality of front mold cavities and a column of a plurality of back mold cavities, wherein the columns extend in the direction of the path the mold plate travel. Each of the plurality of front mold cavities is filled by a corresponding branch fill slot of a plurality of branch fill slots feeding off from the main fill slot. Each of the front and back knockout assemblies has a plurality of knockout shafts and knockout cups corresponding to the number and arrangement of the corresponding plurality of mold cavities.

Figure 5:
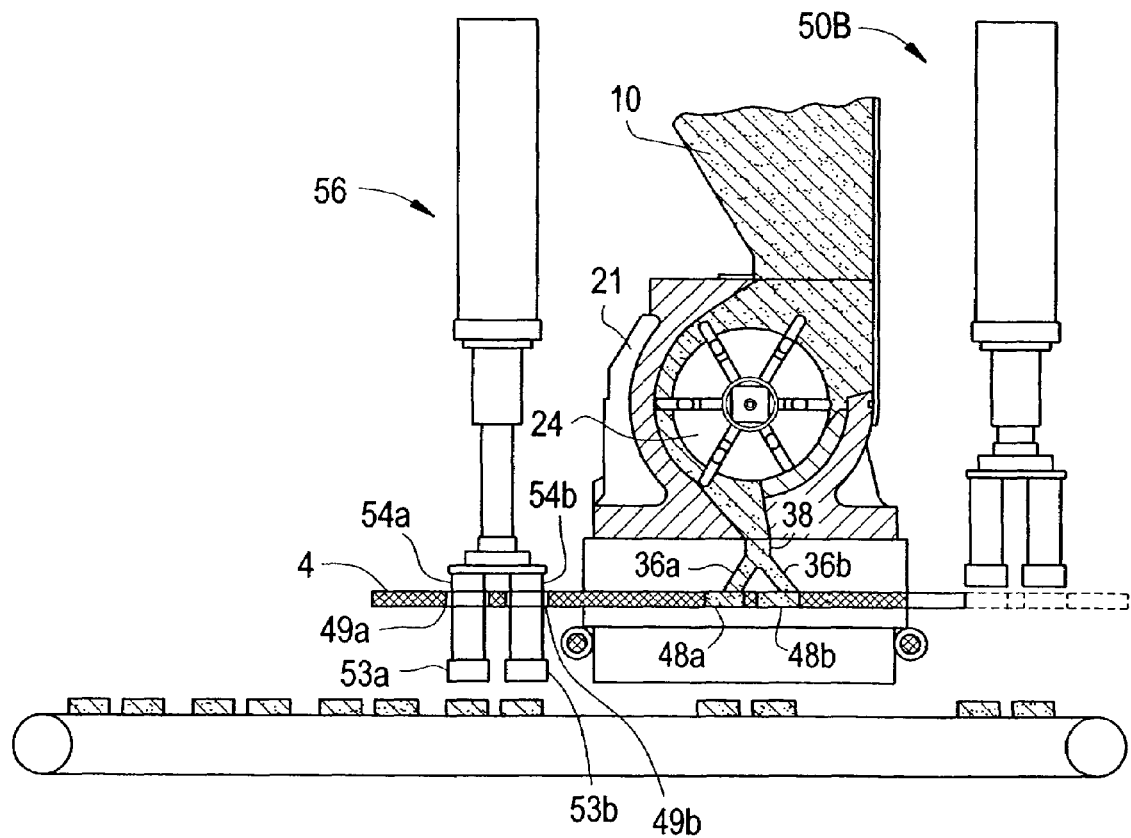
FIG. 5 is a cross sectional view of another embodiment of the invention.

For example, there is a column of two front mold cavities and a column of two back mold cavities, as shown in FIG. 5. In this embodiment, there are two branch fill slots 36a, 36b branching off from the main fill slot 38 to permit simultaneous filling of the two back mold cavities 48a, 48b in the mold plate 41 and knocking out of portioned material in the two front mold cavities 49a, 49b by the action of two front knockout shafts 54a, 54b and two front knockout cups 53a, 53b at the front knockout assembly 56.

Figure 6:
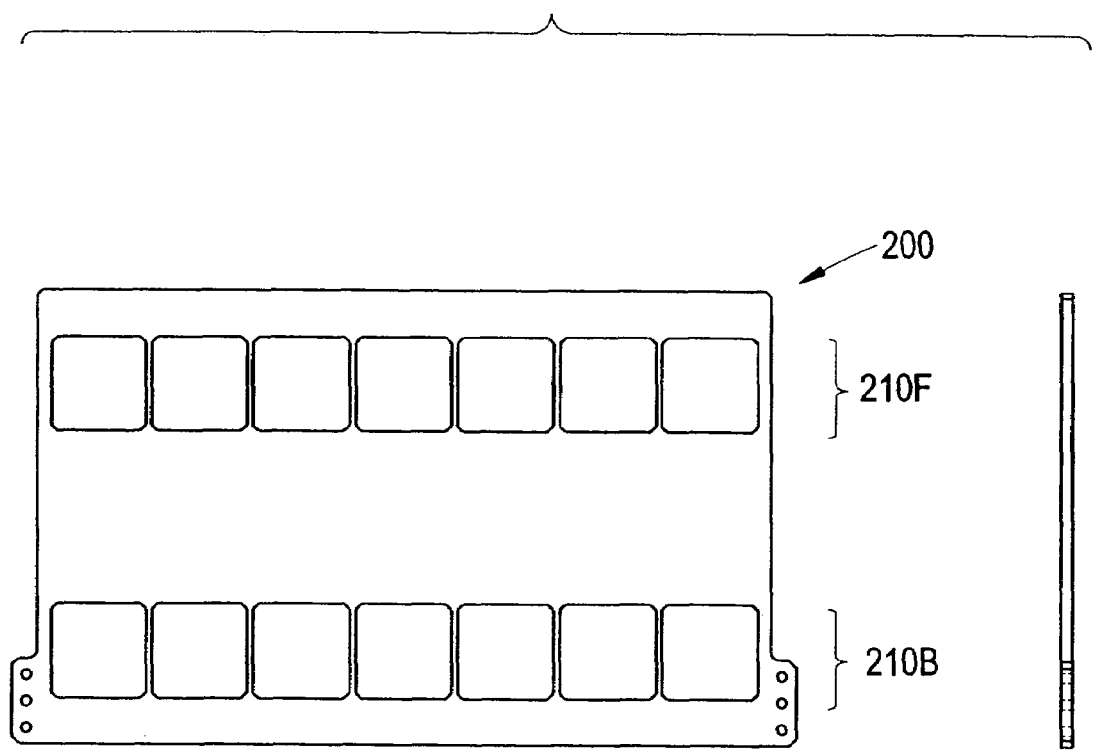
FIG. 6 is a plan view of an embodiment of the mold plate.

In another alternative embodiment shown in FIG. 6, there is a mold plate 200 having a row of a plurality of front mold cavities 210F and a row of a plurality of back mold cavities 210B, wherein the rows 210F, 210B extend in the direction substantially perpendicular to the direction of mold plate travel. As in the previous embodiment, there is a corresponding arrangement of a row of branch fill slots to permit simultaneous filling of all mold cavities in a row. Likewise, there is a corresponding row of shafts and knockout cups to push out the portioned material in the row of mold cavities.

In yet another embodiment of the invention, there is a plurality of front mold cavities in rows and columns and a plurality of back mold cavities in rows and columns. Accordingly, there is a matching arrangement of branch fill slots, mold cavities, and knockout shafts and cups. Further, in this and other embodiments there is a matching arrangement of breathe holes to vent air from the respective mold cavities. In one knockout stroke, all flowable material in the front mold cavities are knocked out while all the back mold cavities are filled with flowable material.

In an alternative embodiment, there is a plurality of front mold cavities in rows and columns and a plurality of back mold cavities in rows and columns. Unlike the previous embodiment, there is only one row of branch fill slots to simultaneously fill one row of mold cavities disposed along a direction approximately perpendicular to the direction of motion of the mold plate. Likewise, there is only one row of knockout shafts at each of the front and back knockout assemblies. In operation, a first row of front mold cavities is filled by the row of branch fill slots while the row of back knockout shafts knock out the portioned material in the first row of the back mold cavities. Then the mold plate shifts a small distance so a second row of front mold cavities is filled and the portioned material in a second row of back mold cavities is knocked out. After the last row of the front mold cavity is filled and the flowable material in the last row of the back mold cavity is knocked out, the mold plate travels in the reverse direction to permit the row by row knockout of the front mold cavities and row by row filling of the back mold cavities. Therefore, for a mold plate with n rows of front mold cavities and n rows of back mold cavities, there are 2×n knockout strokes per mold stroke. If there are 8 mold cavities per row, then there are 2×n×8 portioned materials produced per mold stroke.

Figure 7A:
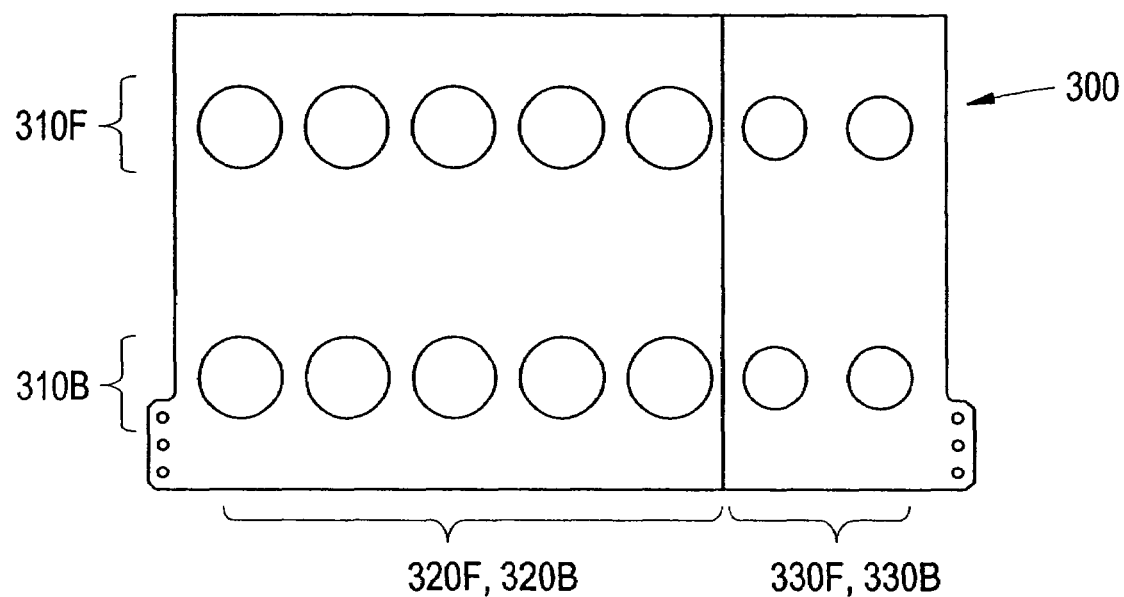
FIGS. 7A-7B are plan and side views of another embodiment of the mold plate.
Figure 7B:
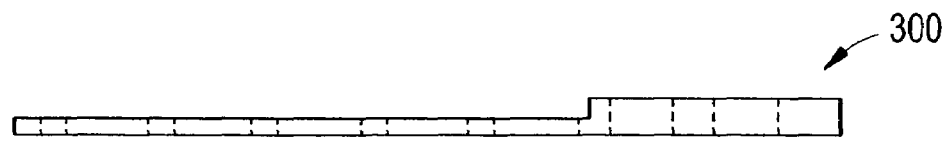

Alternatively, in another embodiment shown in FIGS. 7A-7B, a step down mold plate 300 of variable height is utilized. There is a front row of mold cavities 310F and a back row of mold cavities 310B in the mold plate 300. However, a number of mold cavities at an end of the front row of mold cavities 310F have a first predetermined size and the remaining mold cavities in the front row of mold cavities have a second predetermined size. Likewise, a corresponding number of mold cavities at the same end of the back row of mold cavities 310B have the first predetermined size and the remaining mold cavities have the second predetermined size. The predetermined sizes vary in one of at least diameter, height, and shape.

In FIGS. 7A-7B, the mold cavities 320F of the front row 310F and the mold cavities 320B of the back row 310B have a first predetermined size optimized for 3 oz. hamburger patties, for example. The mold cavities 330F of the front row 310F and the mold cavities 330B of the back row 310B have a second predetermined size optimized for 4 oz. hamburger patties. In FIG. 7A, the mold cavities 330F, 330B have smaller diameters than the mold cavities 320F, 320B. FIG. 7B, however, shows the mold plate 300 as having a height where the mold cavities 330F, 330B are disposed, that is greater than the height where the mold cavities 320F, 320B are disposed.

To provide a uniform interface with a fill plate 330, there is an adapter plate 310 fixedly mounted to the fill plate 330. The combined height of the mold plate 300 where the mold cavities 320F are disposed, and the height of the adapter plate 310 is substantially equal to the height of the mold plate 300 where the mold cavities 330F are disposed. As shown in FIG. 9, the adapter plate 310 provides for adapter fill slots 312 to extend the fill slots 332 of the fill plate 330. In another embodiment of the adapter plate 310, the adapter plate fill slots 312 are of different size than the fill slots 332 to provide a different flow rate of the flowable material at the mold cavities 320F.

There is a knockout assembly 500 with a plurality of knockout shafts and knockout cups, wherein the cups have sizes corresponding to the mold cavities disposed below. In an alternative embodiment, a spacer 510 may be utilized in a shaft 552 to position the knockout cup 553 at an appropriate height when knockout cups of different heights are used in one knockout assembly. Thus, for every knockout stroke, wherein one knockout stroke is the knock out of an entire row of mold cavities, five 3 oz. hamburger patties are knocked out and two 4 oz. hamburger patties are knocked out.

Below the knockout assembly 550, there are conveyor belts 370, 372 for transporting the portioned materials in different directions. In another embodiment, the conveyor belts convey the portion material toward one side of the portioning machine.

In addition to improved output rate, the front and back air vents in a breathe plate, communicating with the same air chamber 64 allows the maintenance of even air pressure in the front and back mold cavities when they are filled. Further, the breathe plate can be easily replaced with another breathe plate with different arrangement or size of air vents to suit the size of a mold cavity or the type of flowable material. The throttling of the air in the mold cavity and the air chamber is possible through the use of different air release valves.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A method for portioning flowable material, the method comprising:
    urging the flowable material through a fill hole to a mold having a first mold cavity and a second mold cavity;
    reciprocatively moving the mold along a path, at one of first and second positions;
    filling the first mold cavity with the flowable material and removing a second portioned material from the second mold cavity when the mold is at the first position; and
    filling the second mold cavity with the flowable material and removing a first portioned material from the first mold cavity when the mold is at the second position,
        wherein said flowable material is urged downward through said fill hole from a hopper disposed above said mold
    urging particles of flowable material out of an air chamber in communication with at least one of the first and second mold cavities, said urging of particles being performed by at least one auger member.

2. The method as claimed in claim 1, wherein the step of reciprocatively moving the mold includes moving the mold along a substantially linear direction.

3. The method as claimed in claim 1, further comprising:
    venting air from one of first and second mold cavity being filled with the flowable material, into the air chamber; and
    releasing air from the air chamber.

4. The method as claimed in claim 1, wherein the step of urging the flowable material through a fill hole comprises:
    rotating a rotor along a rotation axis;
    extending a vane of a plurality of vanes outwardly from the rotation axis to project out of a rotor surface to push the flowable material toward the fill hole;
    retracting the vane inside the rotor when the vane is moving away from the fill hole.

5. The method claimed in claim 3, wherein said air is vented from one of said first and second mold cavities, through a vent plate disposed directly between said air chamber and one of said first and second mold cavities.

6. The method as claimed in claim 1, wherein the first and second removed portions are dropped onto a conveying system which conveys the first and second removed portions along a single path.

7. The method as claimed in claim 1, wherein the first and second removed portions are dropped onto a single conveyor belt.

* * * * *